June 27, 1961 — R. C. MONTROSS — 2,990,506
MOTOR CONTROL CIRCUIT
Filed Feb. 12, 1959 — 2 Sheets-Sheet 1

INVENTOR.
Robert C. Montross
BY Clyde H. Haynes
his atty

United States Patent Office 2,990,506
Patented June 27, 1961

2,990,506
MOTOR CONTROL CIRCUIT
Robert C. Montross, Thiensville, Wis., assignor to Square D Company, Detroit, Mich., a corporation of Michigan
Filed Feb. 12, 1959, Ser. No. 792,782
7 Claims. (Cl. 318—284)

The present invention relates to the art of controlling the energization of relay coils, and is particularly adapted to the controlling of relay coils which prevent plugging or restarting of an electric motor until the voltage across the armature thereof has decreased to a certain value.

One of the major problems in controlling the energization of relays is to make the relay pick up or operate at a very low voltage, and not subject the relay to very high voltages. Voltage sensitive relays, which are operative when energized with a certain minimum amount of energy, will be damaged if energized with over a certain maximum amount of energy. Such a relay performs properly when the energizing voltage and current for the relay are maintained below the certain maximum.

It has been difficult to construct a relay which will physically withstand, without damage to the relay, excessive voltage and current energizations which may be impressed thereon by the armature of a motor, and at the same time physically respond when the voltage across the armature is below a certain value. Many times a relay of this type, if connected directly across the armature, would have to be capable of operating at a low voltage, for example 20 volts, and also be capable of withstanding excessive voltages up to at least as high as 350 volts. Relays having such capabilities are either not readily obtainable on the market or, if obtainable, would be so expensive that they would be impractical to use for many applications.

The present invention has for one of its objectives the overcoming of the aforementioned problems and others.

Another object of the invention is to devise a new, novel, and useful method and apparatus for controlling the energization of relay coils so that the coil will pick up or operate at a very low voltage and not be subjected to very high voltages, even though both may appear in the circuit to which the relay responds.

A further object of the invention is to provide a new, novel and useful anti-plug and anti-restart control for a motor.

Figure 1:
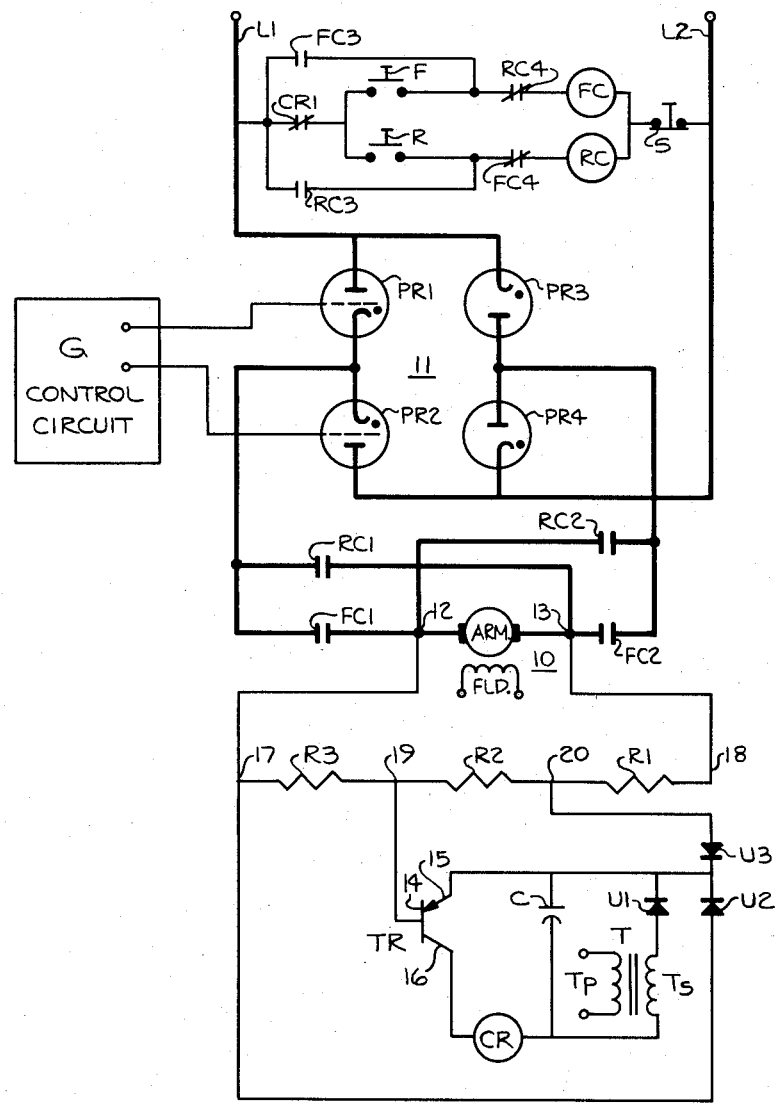
Figure 2:
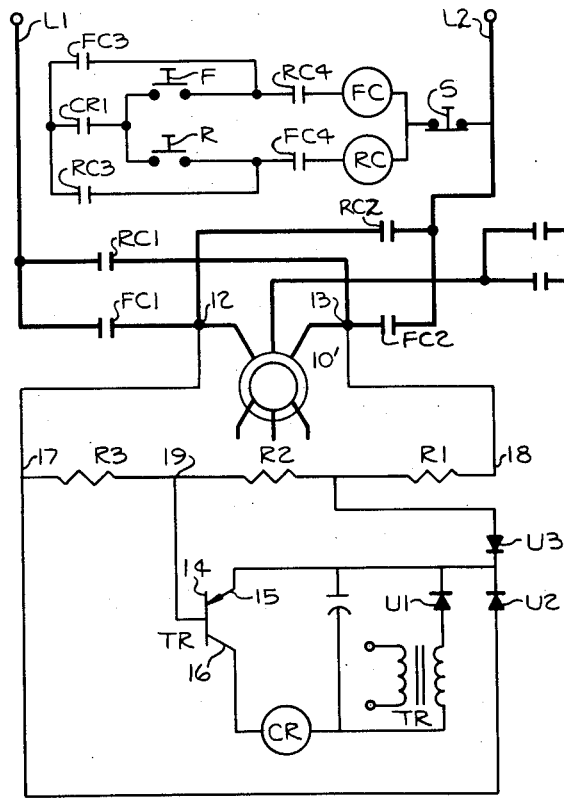

Other objects and a fuller understanding of this invention may be had by referring to the following description and claims, taken in conjunction with the accompanying drawings in which:

FIGURE 1 illustrates, in wiring diagram, the invention as used in connection with a D.-C. motor; and FIGURE 2 illustrates, in wiring diagram, the invention as used in connection with an A.-C. motor.

One of the most logical ways of overcoming the aforementioned problem is to not subject the relay coil of a voltage sensitive relay to high voltages when it is made to operate on low voltage. This is easily accomplished when the voltage of the relay circuit, and to which the relay responds, is derived from a voltage source which is stable or does not vary appreciably. However, and contrary to this, the voltage across the armature of a reversible or bidirectional motor often varies considerably and over a wide range from very low to very high voltages, for example from —350 to 0 to +350 volts on a 440 volt line voltage motor. The relay coil in the present circuit is not subjected to these extreme voltage variations in the armature, and on the contrary, is energized by a fairly stable, substantially constant, voltage source. A transistor and voltage divider interassociated with the relay energizing source and the motor armature control the energization of the relay coil. In this way the circuit is voltage responsive to the voltage of the armature and the relay is energized when the voltage of the armature is at or below a certain very low voltage, and very high armature voltages are not impressed on the relay coil to damage it.

A circuit including the relay and its energizing loop circuit along with a motor and the transistor and voltage divider, has been schematically illustrated in the drawings to exemplify, but not limit, the scope of the invention.

For the purpose of easily following the circuit, the individual relays and contactors (all of which are herein referred to as relays) used therein are schematically illustrated, and are described with reference to their operating coils and respective contacts. Each of the relay contacts operated by and associated with a particular relay coil, carries that coil's reference character suffixed by a number. Further, in the present description, certain control circuits and details of parts of the control, not specifically relating to the operation of the present invention, have been eliminated, so that the description more clearly sets forth the structure and operation of the present invention.

FIG. 1 illustrates a D.-C. motor 10 connected through a full wave rectifier bridge 11 to a source of power supply, identified by the lines L1 and L2. The motor 10 has an armature ARM provided with terminals 12 and 13, and a shunt field FLD, the field being separately energized from any suitable source of energization (not illustrated in the drawing). The armature ARM is connected to the output side of the rectifier 11 through suitable forward contacts FC1 and FC2 or reversing contacts RC1 and RC2 of forward and reversing relays.

The full wave rectifier 11, in this instance, comprises grid controlled thyratrons PR1 and PR2, the grids of which may be controlled by any suitable control circuit G and thyratrons PR3 and PR4. It is understood that the thyratrons may all be identical. Furthermore, any standard full wave rectifier circuit as commonly used in energizing direct current motors from A.-C. power supplies, or other suitable rectification apparatus, may be used in place of the thyratrons, since the exact form of rectification equipment for rectifier bridge 11 is not a part of the present invention.

The normally open forward relay contacts FC1 and FC2 are closed upon energization of their forward relay operating coil FC, which is connected for energization between the lines L1 and L2. The coil FC is connected in series with normally closed control relay contacts CR1, normally open and manually operable forward switch F, normally closed relay contacts RC4, and normally closed and manually operable stop switch S, all of which are connected in series directly across the lines L1 and L2. Interconnected in parallel with the series connection of the relay contacts CR1 and the forward switch F are normally open relay contacts FC3, which are closed upon energization of the coil FC to interlock the forward switch F, and maintain energization of the coil FC after the switch F has been momentarily pressed or closed and until the stop switch S is opened.

The normally open reverse relay contacts RC1 and RC2 are closed upon energization of their reverse relay operating coil RC, which is also connected for energization between the lines L1 and L2. The coil RC is connected in series with the aforementioned relay contacts CR1, a normally open and manually operable reverse switch R, normally closed relay contacts FC4, and the aforementioned stop switch S, all of which are connected in series directly across the lines L1 and L2. Interconnected in parallel with the series connection of the relay contacts CR1 and the reverse switch R are normally open relay contacts RC3, which are closed upon energization of the coil RC to interlock the reverse switch R, and maintain energization of the coil RC after the switch R has been momentarily pressed or closed and until the stop switch S is opened.

Except for the normally closed control relay contact CR1, the motor circuit thus far described operates in a well known manner for controlling the forward and reverse operation of a motor. Without the control relay contacts CR1, opening the stop switch S while the motor is rotating in the forward direction, and immediately closing the reverse switch R, would plug the motor or attempt to quickly reverse the direction of rotation of the armature. However, by inserting the control relay contact CR1 in the circuit in series with the switches F and R, and then providing means responsive to the magnitude of voltage potential across the armature, the motor control circuit is made inoperative to start the motor in at least one of its directions, or to plug it, until rotation has stopped or has been reduced sufficiently to prevent damage to motor or controller.

The contacts CR1 are opened upon energization of their respective operating coil CR, which is connected for energization in a loop circuit with the secondary TS of a transformer T. The primary TP of the transformer is connected to any suitable source of power (not shown). Energization of the relay coil CR is controlled by a transistor TR, having a base 14, an emitter 15, and a collector 16. The control relay CR is connected in series with the collector 16, the emitter 15, a rectifier U1 and the transformer secondary TS, with the rectifier U1 poled to direct flow of unidirectional current through the rectifier to the emitter and from the collector through the operating coil CR to the transformer secondary TS. A filter condenser C is interconnected across the series connection of the transformer secondary TS and the rectifier U1 for filtering purposes.

As previously mentioned the energization of the operating coil CR is in accordance with the voltage potential across the armature brushes 12 and 13. To make the energization responsive to this potential a voltage divider, comprising resistors R1, R2 and R3, which are connected in series, is connected across the armature with the extreme end 17 of resistor R3 connected to the brush 12 and the extreme end 18 of resistor R1 connected to the brush 13. The energization of the operating coil CR takes place regardless of the polarity of the voltage potential across the armature brushes 12 and 13 by so interconnecting the emitter 15 and base 14 of the transistor in a closed loop with the voltage divider to cause energization of the coil CR when there is a potential across the armature brushes. This feature is obtained by connecting the base 14 of the transistor TR to a point 19 between resistors R2 and R3, by connecting the emitter 15 through a rectifier U2 to the end 17 of resistor R3, and by connecting emitter 15 through a rectifier U3 to a point 20 between resistors R1 and R2. The rectifiers U2 and U3 are poled to direct current in a direction from their respective point of connection to the resistors through the emitter to the base and then back to the point of connection 19 between the resistors R2 and R3.

In operation, the motor is started in the forward direction by closing the switch F, thereby causing energization of the coil FC and closing of the contacts FC1, FC2, and FC3 and opening of the contacts FC4. Direct current from the rectifier bridge 11 flows through the contacts FC1, armature ARM, contacts FC2 and back to the rectifier bridge 11. The opening of the contacts FC4 prevents energization of the coil RC. Closing of the contacts FC3 interlock the switch F to continue energization of the coil FC. The motor will continue running in the forward direction and at speeds as controlled by control circuit G and the grids of the rectifiers PR1 and PR2 until the switch S is opened.

While the motor is running, the voltage potential across the armature and between brushes 12 and 13 is impressed across the resistors R1, R2, and R3. This impresses a voltage potential between the emitter 15 and base 14, allowing transistor TR to conduct current from the transformer secondary TS through rectifier U1, emitter 15 to collector 16 and then through the operating coil CR. Upon energization of the coil CR, the contacts CR1 are opened and remain open until the voltage potential across the armature has diminished to zero, or to a very low value. As long as there is sufficient voltage potential across the armature and between the brushes 12 and 13 to keep CR energized, closing of the reversing switch R will not energize the reversing contactor coil RC. This is true even though the stop switch S may have been momentarily opened to deenergize the coil FC and allow the relay contacts FC4 to close. Operation of the circuit for other directions of rotation is very similar to that operation just described.

The present invention, as illustrated in both FIGS. 1 and 2, provides a circuit which is particularly adapted to the controlling of relay coils to prevent plugging or restarting of an electric motor until the voltage across the armature has decreased to a certain value or zero. A D.-C. motor energized through a bridge rectifier has been illustrated and described for operation in one of its directions of rotation. It is noted that the polarity across the armature does not affect the energization of relay CR because the rectifiers U2 and U3 establish a unidirectional potential across the emitter to base of the transistor. Naturally if an A.-C. motor is used in place of a D.-C. motor the invention will operate the same as described in connection with FIG. 1. Because of this, FIG. 2 is the same as FIG. 1, except that in FIG. 2 motor 10' is an A.-C. motor, and the rectifier bridge 11 has been omitted. When an A.-C. voltage is developed across the armature the rectifiers U2 and U3 will rectify this voltage to impress a unidirectional voltage across the emitter to base of the transistor.

The circuit heretofore described will provide sufficient voltage to energize the relay coil CR without imposing excess voltages thereon. The transistor TR in the circuit acts as a current amplifier and will pass sufficient current to energize the relay CR when it operates in an unsaturated state. When the input signal to the transistor increases to cause the transistor to approach saturation, the relay CR coil voltage will increase accordingly. However, the relay CR coil is energized from a separate source including transformer T and rectifier U1. When the input signal to the transistor causes the transistor to become saturated, the voltage across the relay CR coil will be at a maximum value limited by the output voltage of transformer T, so that further increases of input current to the transistor will provide no further increases in relay coil voltage. This permits very high transistor input currents, corresponding to high armature voltages without over-voltage on relay CR coil.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A voltage responsive circuit for controlling the energization of a relay coil in response to current flow through an armature of a reversible motor, said circuit comprising, a first source of current and voltage, a voltage divider connected to be energized by current flow in the armature, a transistor having a base, an emitter, and a collector, first means connecting said coil, said first source, said collector, and said emitter in series in a first closed loop for the passage of current from said first source through said coil to energize said coil, second means connecting a portion of the voltage divider, said base, and said emitter in series in a second closed loop to control the amount of current flowing in said first closed loop and between said emitter and collector in response to the current flow in said divider, switch means selectively operable to control the direction of rotation of the reversible motor and contacts actuated by the relay coil arranged in circuit with said switch means to prevent operation of the switch means when current flows through the voltage divider.

2. The structure of claim 1 including a rectifier in each of said closed loops to limit current flow therein to unidirectional current flow.

3. In combination with an electric motor provided with an armature rotatable in forward and reverse directions, a source of power, forward and reversing switch means selectively operable to connect said armature to said source of power to energize said armature for forward or reverse rotation, relay contacts movable to prevent operation of said switch means during rotation of said armature, a relay coil energizable to move said relay contacts, a source of current to energize said coil, a transistor having a base, an emitter, and a collector, first means connecting said coil, said collector, and said emitter in series in a first closed loop to said source of current to energize said coil, a voltage divider shunting said armature, and second means connecting said base and said emitter in series in a second closed loop to said divider to control the flow of current in said first closed loop to effect energization of said coil and thereby prevent operation of said switch means during rotation of said armature.

4. The structure of claim 3 including rectifier means in each of said closed loops with the rectifiers poled to cause current flow in said first loop when current flows in said second loop thereby to energize said relay coil when a voltage potential appears across said armature and to render said coil free of energization when said armature is free of a voltage potential.

5. The structure of claim 3 wherein said relay contacts are normally closed and are moved to their open position upon energization of said relay coil.

6. The structure of claim 3 wherein said voltage divider has its opposite ends connected to said armature, an intermediate tap connected to said base, and at least one of said ends connected to said emitter.

7. The structure of claim 6 including a rectifier interposed in said second loop in series with said base and emitter.

No references cited.